United States Patent
Simon

(10) Patent No.: US 11,675,318 B2
(45) Date of Patent: Jun. 13, 2023

(54) MULTI-INTERFACE GPS TIME SYNCHRONIZATION

(71) Applicant: Continental Automotive Systems, Inc., Auburn Hills, MI (US)

(72) Inventor: Aaron Simon, Santa Barbara, CA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 567 days.

(21) Appl. No.: 16/732,280

(22) Filed: Dec. 31, 2019

(65) Prior Publication Data

US 2021/0200162 A1  Jul. 1, 2021

(51) Int. Cl.
G04R 20/02 (2013.01)
H04J 3/06 (2006.01)
H04W 56/00 (2009.01)

(52) U.S. Cl.
CPC ............ *G04R 20/02* (2013.01); *H04J 3/0644* (2013.01); *H04J 3/0667* (2013.01); *H04W 56/0015* (2013.01)

(58) Field of Classification Search
CPC ...... G04R 20/00–08; H04J 3/06–0697; H04W 56/001; H04W 56/0015;
(Continued)

(56) References Cited

U.S. PATENT DOCUMENTS

| 7,583,704 | B1 * | 9/2009 | Walker | H04J 3/0644 |
| | | | | 725/111 |
| 7,975,160 | B2 * | 7/2011 | Smith | G04F 10/00 |
| | | | | 713/502 |

(Continued)

FOREIGN PATENT DOCUMENTS

| CN | 101547083 B | 9/2009 |
| CN | 104678754 A | 6/2015 |

(Continued)

OTHER PUBLICATIONS

Li et al. "Time synchronization design based on FPGA in integrated GPS/INS system", Proceedings of the 2009 IEEE International Conference on Mechatronics and Automation, Aug. 9-12, 2009, Changchun, China, pp. 3769-3774, IEEE.

*Primary Examiner* — Chi H Pham
*Assistant Examiner* — Vladislav Y Agureyev

(57) ABSTRACT

A time synchronizer receives UTC (Coordinated Universal Time) time in serial+PPS (Pulse Per Second) format from a GPS (Global Positioning System) device and outputs timestamp data in multiple formats, including: CAN (Controller Area Network), Ethernet, gPTP (generic Precision Time Protocol), and serial+PPS. Multiple data sources receive timestamp data in the multiple formats and each provide data in a unified UTC time base to a sensor-fusion device. The unified UTC time base is based on the timestamp data in the multiple formats output by the time synchronizer. The time synchronizer may perform edge detection for a first transition of an internal clock signal following a transition of the PPS signal received from the GPS device. The internal clock signal may be asynchronous with the PPS signal received from the GPS device. The internal clock signal may have a frequency of 40 MHz.

10 Claims, 4 Drawing Sheets

(58) Field of Classification Search
CPC . H04W 56/002–0025; G04G 7/02–026; H04L 12/40; H04L 12/407; H04L 12/413; H04L 12/4135; H04L 12/417; H04G 9/04
See application file for complete search history.

(56) References Cited

U.S. PATENT DOCUMENTS

| | | | | |
|---|---|---|---|---|
| 8,180,516 | B2* | 5/2012 | Remboski | B60R 16/0232 701/36 |
| 8,995,837 | B2* | 3/2015 | Mizuguchi | H04B 10/25 398/43 |
| 9,369,270 | B1* | 6/2016 | Spijker | H04J 3/0658 |
| 9,596,073 | B1* | 3/2017 | Reyes | G01R 25/00 |
| 2008/0278345 | A1* | 11/2008 | Van Bosch | H04B 7/18563 340/870.07 |
| 2009/0034672 | A1 | 2/2009 | Cho et al. | |
| 2009/0168808 | A1 | 7/2009 | Zheng | |
| 2010/0220006 | A1* | 9/2010 | Arab | G04G 7/026 342/357.26 |
| 2011/0286560 | A1* | 11/2011 | Pignatelli | H04J 3/0655 375/356 |
| 2012/0256789 | A1* | 10/2012 | Bull | G01S 5/0221 342/450 |
| 2013/0121347 | A1* | 5/2013 | Saito | H04J 3/0697 370/474 |
| 2015/0331422 | A1* | 11/2015 | Hartung | G05D 1/021 701/23 |
| 2016/0352388 | A1* | 12/2016 | Lane | H04B 1/3822 |
| 2017/0032795 | A1* | 2/2017 | Burtea | H04Q 9/04 |
| 2017/0139411 | A1* | 5/2017 | Hartung | H04L 12/40 |
| 2018/0084513 | A1* | 3/2018 | Sheashua | H04W 56/0035 |
| 2019/0379474 | A1* | 12/2019 | Coulter | H04J 3/0632 |
| 2020/0014525 | A1* | 1/2020 | Nasr | G05D 1/021 |
| 2020/0022100 | A1* | 1/2020 | Simon | H04L 7/0037 |
| 2020/0357205 | A1* | 11/2020 | Bennington | G04G 7/02 |
| 2021/0127351 | A1* | 4/2021 | Stojanovski | H04W 48/16 |
| 2021/0218488 | A1* | 7/2021 | Zhang | G06K 9/6289 |

FOREIGN PATENT DOCUMENTS

| | | |
|---|---|---|
| CN | 105353603 A | 2/2016 |
| CN | 205017341 U | 2/2016 |
| JP | 5080202 B2 | 5/2009 |

\* cited by examiner

MULTI-INTERFACE GPS TIME SYNCHRONIZATION

BACKGROUND

Embodiments of the invention relate to providing a single time base, which is based on UTC time (Coordinated Universal Time) from GPS (Global Positioning System), across multiple types of interfaces, including interfaces used for ADAS/HFL (Advanced Driver-Assistance Systems/ High-resolution Flash Lidar).

Different data sources in ADAS applications use individual GPS antennas to put data in a common time base, typically UTC time. For example, Velodyne uses a Garmin GPS, RT-Range uses their own GPS, etc. This gives the various data outputs a timestamp in UTC time. The date and time is usually provided via a serial signal and more precise timing is realized via a Pulse Per Second (PPS) output from the GPS, with the rising edge marking the start of a new second.

Typical Test Vehicles used for ADAS development have a suite of sensors, both development and reference systems, from which data has to be interpreted in a common time base in order to have relevant meaning. What is meant by relevant is that if events occur at the same time and are captured by different sensors, based on the system architecture, it may be impossible to ever correlate the data from the same event with a high degree of accuracy (i.e., if a common time base is not established accurately enough). If data from different sensors cannot be correlated, they are irrelevant to one another.

This same problem extends to embedded systems. For real time fusion (of data from different sensors) to take place in production vehicles, a central processing unit should have a way to correlate events from several sensors that occur at the same time and that are captured by different sensors.

As an example, suppose one sensor is communicating via LVDS (Low-Voltage Differential Signaling) and another sensor is communicating via Ethernet. The same scene is captured by each sensor with the same recording box. But how does an ADAS/HFL developer correlate the data from the two sensors? For that matter, how does an ADCU or other fusion system accomplish this same task?

Different communication protocols have different speeds and latency, and some are deterministic and some are not deterministic.

Test vehicles and production autonomous vehicles fall victim to this same problem, with test vehicles, which are used to develop production vehicles, being particularly susceptible due to the variety of manufacturers' products that are typically used.

Further, there is drift and jitter associated with using multiple GPS antennas, that is, two different antennas will disagree on what the time is.

A potential solution is to timestamp the data. In this manner, the path of travel does not matter, nor does it matter if the communication is deterministic or the speed with which the data is transferred. As long as the incoming data has an accurate time associated with it, the scene at a given time will be known.

But timestamping data is itself wrought with possibilities to corrupt the meaning of common time. The method with which UTC time gets to the individual ECUs has a direct effect on the subsequent processes which rely on accurate time.

Typically, GPS antennas provide a pulse per second, which denotes the start of a new second. GPS antennas are typically one to one, in that serial and DIO (Digital Input/ Output) do not support connections to multiple endpoints. This implies one GPS receiver per ECU.

But there can be drift between receivers that may contribute to the inaccuracy of one or more of the timestamps.

Multiple GPS antennas in close proximity to one another also begin to interfere. Best practice dictates mounting antennas at least one meter away from one another, and if several are needed, there will typically not be enough roof space on a vehicle.

Additionally, most automotive ECUs do not support serial or DIO connections, and most GPS antennas do not come with typical automotive interfaces.

A single GPS antenna can be used in conjunction with a splitter in order to supply multiple devices with the same signal, given that the receivers will accept the same type of input. Splitters introduce delays and can attenuate the signals limiting the cabling and accuracy. And the devices using the splitter must utilize the same type of input (e.g., UTC Time (serial)+PPS).

More recently the industry has been moving toward gPTP (generic Precision Time Protocol) which is a network time synchronization interface. gPTP is not widely adopted yet, that is, not many devices have these interfaces yet.

As such, limiting the number of antennas to one, while providing as many outputs as needed from a common source, bridging the gap between devices which have gPTP interfaces and those which rely on a traditional serial and PPS (Pulse Per Second) input, and providing time information over CAN (Controller Area Network) and Ethernet, which is especially useful in automotive applications, would advance the state of the art.

BRIEF SUMMARY

In accordance with embodiments of the invention, a time synchronizer receives UTC (Coordinated Universal Time) time in serial+PPS (Pulse Per Second) format from a GPS (Global Positioning System) device and outputs timestamp data in multiple formats, including: CAN (Controller Area Network), Ethernet, gPTP (generic Precision Time Protocol), and serial+PPS. Multiple data sources receive timestamp data in the multiple formats and each provide data in a unified UTC time base to a sensor-fusion device. The unified UTC time base is based on the timestamp data in the multiple formats output by the time synchronizer. The time synchronizer may perform edge detection for a first transition of an internal clock signal following a transition of the PPS signal received from the GPS device. The internal clock signal may be asynchronous with the PPS signal received from the GPS device. The internal clock signal may have a frequency of 40 MHz.

DETAILED DESCRIPTION

Embodiments of the invention use a Linux real time controller, with a CAN, Serial, and Ethernet interface as well as an FPGA (Field Programmable Gate Array). The FPGA is synchronized to a single GPS (Global Positioning System) source, this then becomes a master clock. The FPGA creates a PPS (Pulse Per Second) output, as needed, which can be routed to the various devices which rely on this as an input. Additionally, via the serial interface, the GPS date and time message is broadcast to the various devices. A timestamp is also sent via the CAN interface, for devices that can accept this, and via Ethernet as well. Furthermore, there is a gPTP (generic Precision Time Protocol) interface which is set to bypass the IEEE 1588 Best Master Clock Algorithm and which is designated as the master clock on whatever gPTP network it is connected to.

Figure 1:
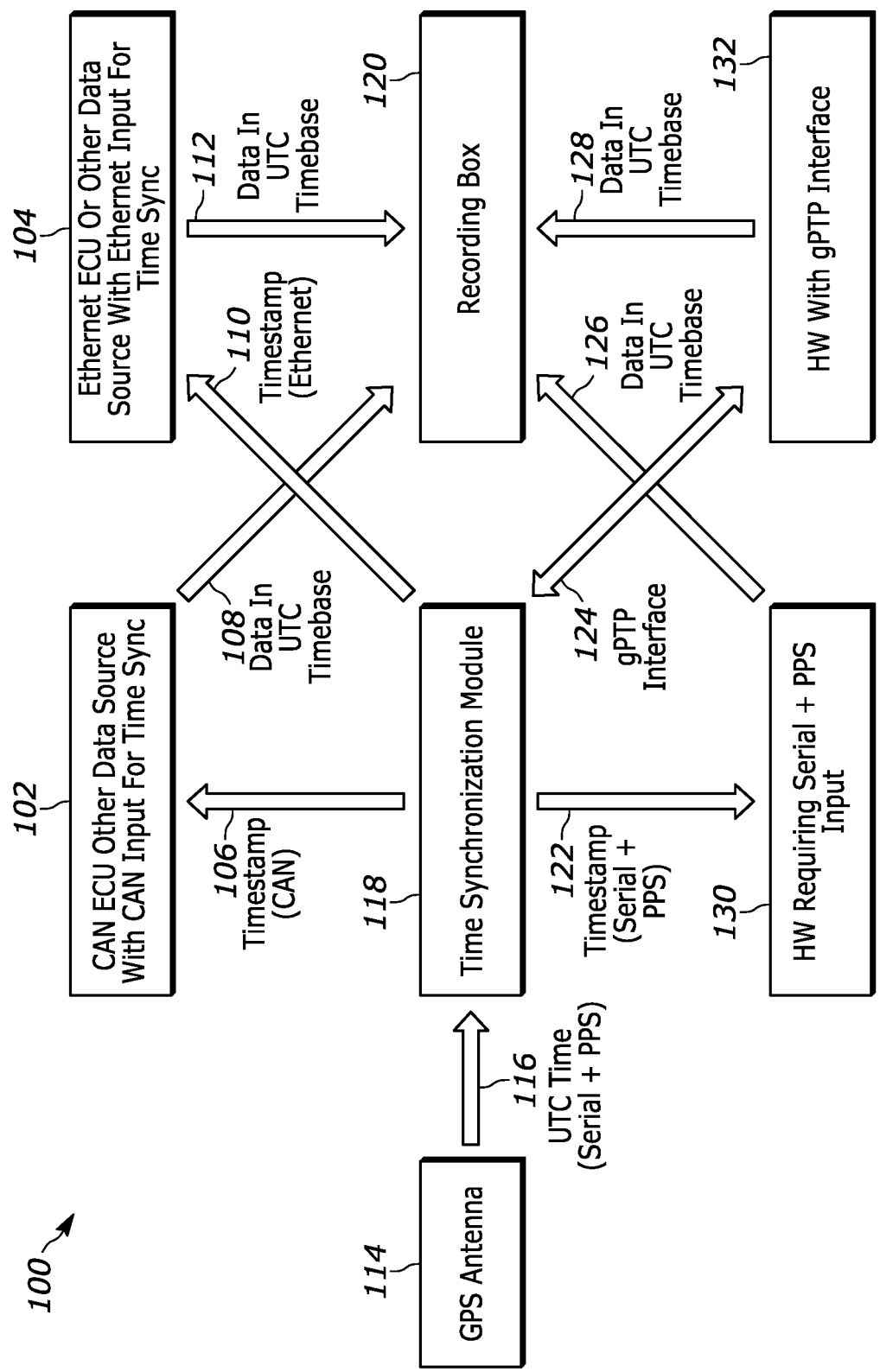
FIG. 1 depicts an apparatus for providing multi-interface GPS time synchronization in accordance with embodiments of the invention.

FIG. 1 depicts an apparatus 100 for providing multi-interface GPS time synchronization in accordance with embodiments of the invention. As depicted in FIG. 1, a GPS antenna 114 outputs UTC Time (serial)+PPS, which is input to a time synchronization module 118, which outputs a timestamp in various formats to various other modules. The time synchronization module 118 outputs a timestamp 106 in CAN message format to a CAN ECU 102 and/or one or more other data sources with CAN input for time synchronization. The time synchronization module 118 outputs a timestamp 110 in Ethernet message format to an Ethernet ECU 104 and/or one or more other data sources with Ethernet input for time synchronization. The time synchronization module 118 outputs a timestamp 122 in Serial+PPS message format to one or more other data sources 130 having a Serial+PPS input for time synchronization. The time synchronization module 118 exchanges information bidirectionally via gPTP interface 124 with one or more data sources that accept and/or provide timestamp information via the gPTP interface 124.

Each data source, namely, the CAN ECU 102 and/or one or more other data sources with CAN input for time synchronization, the Ethernet ECU 104 and/or one or more other data sources with Ethernet input for time synchronization, the one or more other data sources 130 having a Serial+PPS input for time synchronization, and the one or more data sources that accept and/or provide timestamp information via the gPTP interface 124, output data in a unified UTC time base to the recording box 120, as depicted by 108, 112, 126, and 128, respectively.

Figure 2:
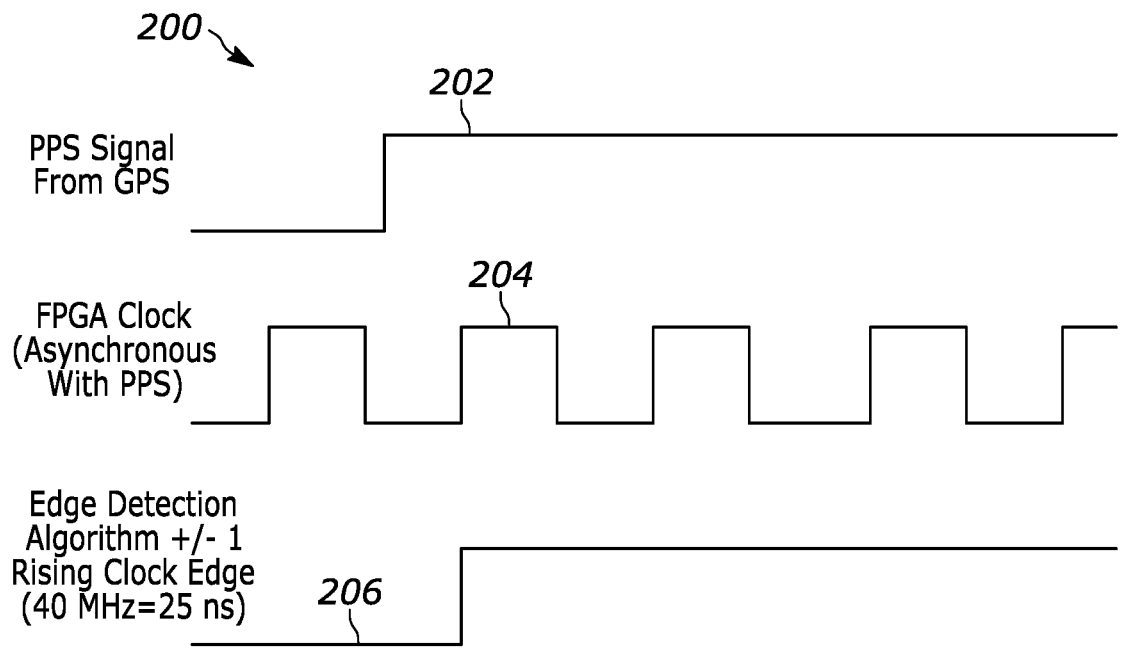
FIG. 2 is a timing diagram depicting edge detection in accordance with embodiments of the invention.

FIG. 2 is a timing diagram 200 depicting edge detection in accordance with embodiments of the invention. A PPS signal 202 from GPS includes a rising edge. FPGA clock 204, is a 40 MHz clock signal that is asynchronous with the PPS signal 202. Generating such clock signals is well known in the art. And frequencies other than 40 MHz may also be used. Upon a first rising edge of the FPGA clock signal 204 following the rising edge of the PPS signal 202, edge detection signal 206 transitions from 0 to 1.

In accordance with embodiments of the invention, the time synchronization module 118 may be an FPGA that generates timestamp information based on the PPS signal 202 from a GPS receiver. The FPGA then controls the timing of other data sources and keeps master time. Master time within the system is then synchronized to +/−period of the FPGA clock signal 204, which still synchronizes the other data sources with each other because the other data sources each receives the same time base, which is shifted from the PPS signal 202 from GPS.

Instead of an FPGA, other embodiments may be implemented in dedicated hardware, a processor that executes computer-executable instructions, and the like.

Figure 3:
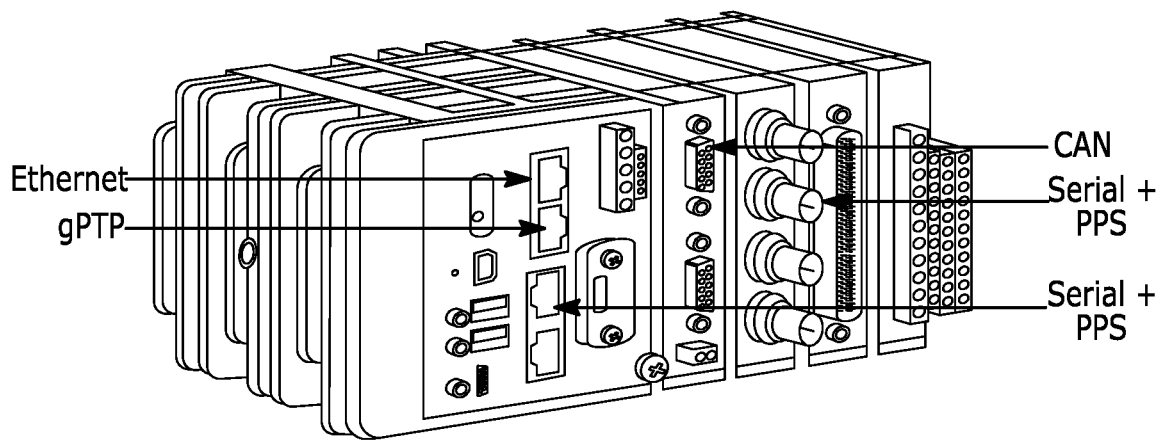
FIG. 3 depicts an embodiment that is realized using a Compact RIO system in accordance with embodiments of the invention.

FIG. 3 depicts an embodiment that is realized using a Compact RIO system, including a CRIO controller and C Series I/O modules, from National Instruments with a controller, processor, and FPGA which has a RTOS (Real Time Operating System). The chassis allows for expandable IO (Input/Output) modules, which increases the configurability.

As depicted in FIG. 3, the interfaces may include one or more of the following types of interfaces: a CAN interface, which is a bus structure; an Ethernet interface, which can be mated to a BroadR switch; a gPTP interface; a DIO interface; and a serial interface. BroadR-Reach technology is an Ethernet physical layer standard designed for use in automotive connectivity applications. BroadR-Reach technology allows multiple in-vehicle systems to simultaneously access information over unshielded single twisted pair cable.

Figure 4:
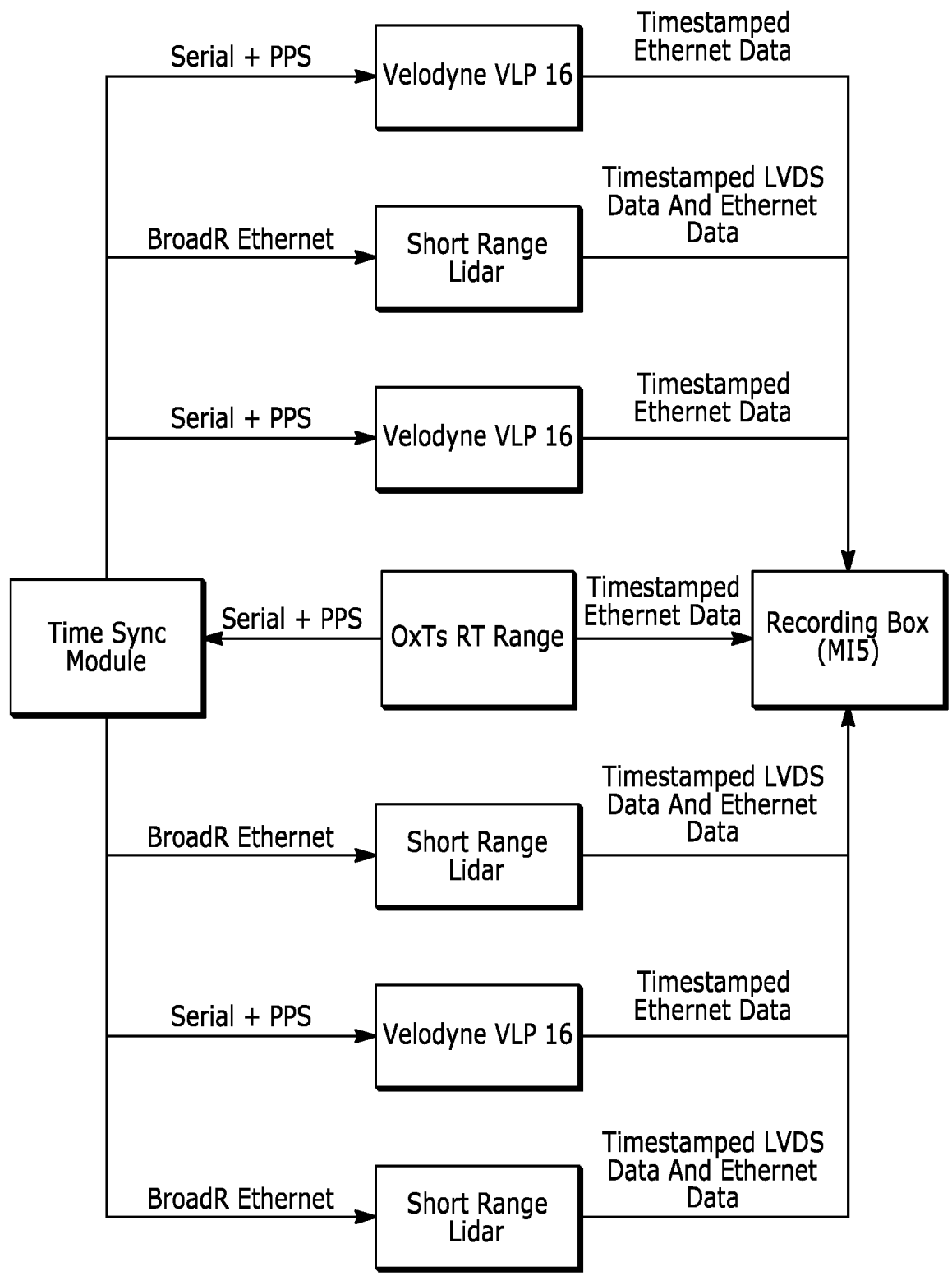
FIG. 4 depicts an embodiment of the invention that is used with an HFL test vehicle in accordance with embodiments of the invention.

FIG. 4 depicts an embodiment of the invention that is used with an HFL test vehicle that uses an RT Range DGPS (Differential GPS) system, which provides position data and also serves as the time source for the time sync module 118. Alongside real-time monitoring systems and a post-processing application, the RT-Range provides precise Vehicle-to-Vehicle, Vehicle-to-Lane and Vehicle-to-Infrastructure measurements for end to end ADAS testing.

The time sync module 118 communicates via, BroadR Ethernet, the timestamp to the HFL. It has a dedicated Serial+PPS interface for each Velodyne VLP 16. The RT Range already has UTC Time to within nanoseconds of the time sync module. The timestamped data is sent to the MI5 recording box and is recorded there.

Figure 5:
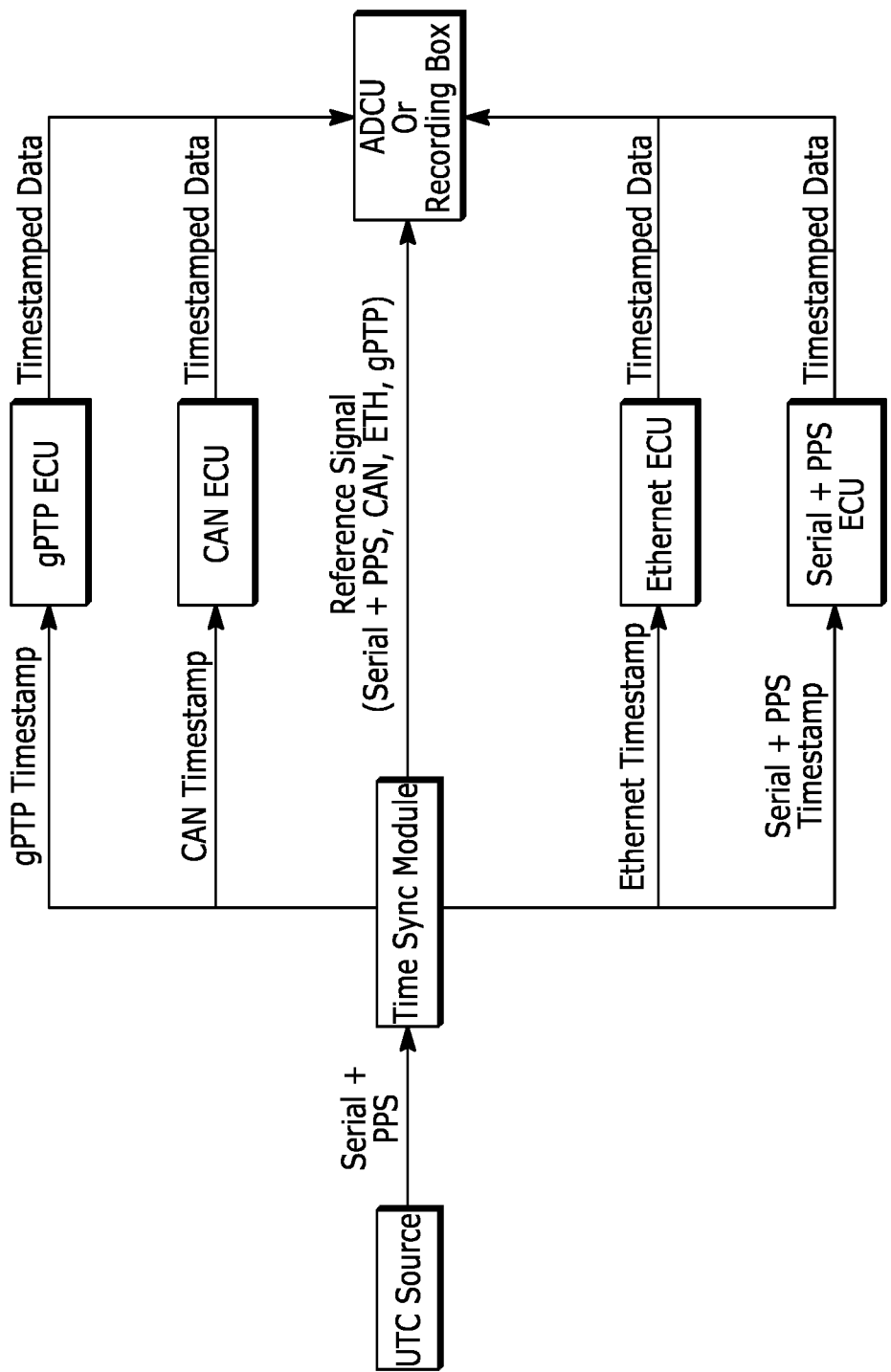
FIG. 5 depicts an embodiment of the invention in which a time synchronizer provides time stamp information, using a single time base, to various ECUs and an ADCU (Automated Driving Control Unit) in accordance with embodiments of the invention.

FIG. 5 depicts an embodiment of the invention in which the time synch module receives UTC time in serial+PPS format and provides time stamp information, using a single time base, to the ECUs and the ADCU (Automated Driving Control Unit) or recording box in the following formats: gPTP, CAN, Ethernet, and/or serial+PPS. When the timing source is a single common module, then the data from various data sources shares a common time base and, for a given time, a scene captured by the data sources can be known from the captured data.

The reference signal depicted in FIG. 5 is a dedicated connection coming from the time sync module to the ADCU/recording box, also referred to as the fusion box. The cabling may be the same in length and composition as to the individual ECUs, and may be used to calculate the latency between signals and the effect of the ECU between the time sync module and the fusion box.

By subtracting $T_R$, which is the time at which a given timestamp arrives at the fusion box from the time sync module, from $T_S$, which is the time at which the corresponding timestamped data arrives from an individual sensor, the effect of the ECU in the system can be calculated.

Similarly, by subtracting the time at which the same timestamp arrives on different interfaces, we can calculate the latency between different interfaces. That is, if the CAN timestamp for a given time arrives at $T_{CAN}$ and the same timestamp arrives via Ethernet at $T_{Eth}$, then their relative latency can be calculated by subtracting one from the other.

In this manner, the time taken from an ECU receiving a timestamp to reporting the data for that given time, as well as the delay between different communication protocols, can be calculated. This allows the fusion box to account for these delays when correlating the data from the various ECUs.

In these ways, embodiments of the invention bridge the gap between traditional GPS timing methods and gPTP time synchronization allowing common time to be kept between these two types of interfaces. The embodiments limit the number of antennas needed to synchronize several devices to UTC time to a single antenna (or two antennas in the case of Differential GPS). The embodiments eliminate the jitter and drift associated with using several different antennas by using a single timing synchronization module as the timing source. And the embodiments provide timing information via CAN and Ethernet for automotive ECU's (Electronic Control Units) that use those communication protocols.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

The invention claimed is:

1. An apparatus comprising:
a time synchronizer configured to receive UTC (Coordinated Universal Time) time in serial+PPS (Pulse Per Second) format from a GPS (Global Positioning System) device and to output timestamp data in a plurality of formats, the plurality of formats including at least two of: CAN (Controller Area Network), Ethernet, gPTP (generic Precision Time Protocol), and serial+PPS, wherein the time synchronizer is configured to perform edge detection for a first transition of an internal clock signal following a transition of the PPS signal received from the GPS device, and wherein the internal clock signal is asynchronous with the PPS signal received from the GPS device;
a plurality of data sources configured to receive timestamp data in the plurality of formats and to each provide data in a unified UTC time base to a sensor-fusion device, wherein the unified UTC time base is based on the timestamp data in the plurality of formats output by the time synchronizer.

2. The apparatus of claim 1, wherein the internal clock signal has a frequency of 40 MHz.

3. The apparatus of claim 1, wherein, based on the edge detection, the time synchronizer controls the timing of, and keeps master time for, the plurality of data sources.

4. The apparatus of claim 3, wherein the master time is synchronized to the internal clock signal.

5. The apparatus of claim 1, wherein the time synchronizer outputs a reference signal to the sensor-fusion device, wherein the reference signal includes timestamp data in the plurality of formats including at least two of: CAN, Ethernet, gPTP, and serial+PPS.

6. A method comprising:
receiving, at a time synchronizer, UTC (Coordinated Universal Time) time in serial+PPS (Pulse Per Second) format from a GPS (Global Positioning System) device; and
outputting, from the time synchronizer, timestamp data in a plurality of formats, the plurality of formats including at least two of: CAN (Controller Area Network), Ethernet, gPTP (generic Precision Time Protocol), and serial+PPS, wherein the time synchronizer performs edge detection for a first transition of an internal clock signal following a transition of the PPS signal received from the GPS device, and wherein the internal clock signal is asynchronous with the PPS signal received from the GPS device;
receiving, at a plurality of data sources, the timestamp data in the plurality of formats; and
providing, from the data sources, data in a unified UTC time base to a sensor-fusion device, wherein the unified UTC time base is based on the timestamp data in the plurality of formats outputted from the time synchronizer.

7. The method of claim 6, wherein the internal clock signal has a frequency of 40 MHz.

8. The method of claim 6, wherein, based on the edge detection, the time synchronizer controls the timing of, and keeps master time for, the plurality of data sources.

9. The method of claim 8, wherein the master time is synchronized to the internal clock signal.

10. The method of claim 6, wherein the time synchronizer outputs a reference signal to the sensor-fusion device, wherein the reference signal includes timestamp data in the plurality of formats including at least two of: CAN, Ethernet, gPTP, and serial+PPS.

* * * * *